United States Patent

[11] 3,586,880

[72] Inventor William Fitzwater, Jr.
Santa Ana, Calif.
[21] Appl. No. 848,813
[22] Filed Aug. 11, 1969
[45] Patented June 22, 1971
[73] Assignee Astrodata, Inc.
Anaheim, Calif.

[54] ISOLATION AND COMPENSATION OF SAMPLE AND HOLD CIRCUITS
11 Claims, 3 Drawing Figs.

[52] U.S. Cl. ........................................................ 307/238, 307/229, 307/246, 307/251, 328/151, 328/165
[51] Int. Cl. ........................................................ H03k 17/00
[50] Field of Search ........................................... 307/229, 231, 238, 246, 251, 304; 328/151, 121, 127, 142, 165; 324/68 A

[56] References Cited

UNITED STATES PATENTS

| | | | |
|---|---|---|---|
| 3,363,113 | 1/1968 | Bedingfield .................. | 307/238 |
| 3,454,787 | 7/1969 | Gelernter ..................... | 307/246 X |
| 3,482,174 | 12/1969 | James .......................... | 307/251 X |
| 3,491,304 | 1/1970 | Justus et al. .................. | 328/127 X |
| 3,504,194 | 3/1970 | Eastman et al. .............. | 307/304 X |
| 3,517,213 | 6/1970 | Britton, Jr. ................... | 307/231 |
| 3,521,141 | 7/1970 | Walton ......................... | 307/246 X |

OTHER REFERENCES

Benson et al., Temperature Compensation for Sample and Hold Circuit, I.B.M. Technical Disclosure Bulletin, October 1966, ppg. 476 & 477. 307/229

*Primary Examiner*—Stanley T. Krawczewicz
*Attorney*—White & Haefliger

ABSTRACT: The invention concerns a sample and hold circuit including charge storage capacitors and switches connected between input and output amplifiers and operable to provide substantially improved isolation of a hold capacitor from the input amplifier, as during the hold period, and also to provide compensation for the transient jump in voltage developed at the hold capacitor during switching.

INVENTOR.
WILLIAM FITZWATER, JR.
By White & Haefliger
ATTORNEYS.

INVENTOR.
WILLIAM FITZWATER, JR.
By White & Haefliger
ATTORNEYS.

ISOLATION AND COMPENSATION OF SAMPLE AND HOLD CIRCUITS

BACKGROUND OF THE INVENTION

This invention relates generally to sample and hold circuits, and more particularly concerns the solution of problems having to do with insufficient isolation and transient development in such circuits.

Basic sample and hold circuits include input and output amplifiers, a hold capacitor connected with the output amplifier, and control circuitry operable to connect and disconnect the input amplifier and hold capacitor. Imperfections in the operation of such circuits derive from the influence of parasitic shunt resistances and capacitances associated with the switch, the impedances of such resistances and capacitances being nonlinear with applied voltage or current in the case of a semiconductor switch. Such applied voltage undergoes substantial change at the time of switching from sample to hold, i.e., opening the switch. As a result, the voltage across the hold capacitor undergoes an undesirable "-jump" (or transient) due to redistribution of electrical charge across parasitic capacitance associated with the switch. One solution is to use a large hold capacitor; however, undesirably large charging currents are then required to obtain short sampling periods.

SUMMARY OF THE INVENTION

It is a major object of the invention to provide a sample and hold circuit characterized as obviating the above-described problems. Basically, the inventive approach is to provide substantially improved isolation of the hold capacitor from the input amplifier, as during the hold period; and also to provide compensation for the transient jump in voltage developed at the hold capacitor during switching.

As will appear, and as regards improved isolation, the invention is embodied in a combination that includes input and output amplifiers; first and second charge storage devices (as for example capacitors), each having opposite terminals; a first switch connected in series between the output side of the input amplifier and one terminal of the first storage device; and a second switch connected in series between that one terminal of the first storage device and one terminal of the second storage device which is also connected with the input of the output amplifier. Accordingly, the storage devices may be charged by the input amplifier while the switches are closed, and the second switch may be effectively isolated from the input amplifier during opening of the second switch while the first switch remains closed, the first storage device operating as a stabilizer. As will be seen, means may be provided to open the second switch just prior to opening of the first switch; and the switches may comprise gate controlled elements (as for example field effect transistors) to which voltage sources may be connected for switching purposes. In the latter event, the second amplifier may advantageously comprise a differential amplifier having a first input terminal to which the second storage device is connected, and a second input terminal, one of the voltage sources (preferably the source that controls the second switch) being connected by an auxiliary switch between the gate of the second switch element and the second input terminal of the second amplifier; as a result, the output voltage from the second amplifier may be made equal to the voltage across the hold (or second) storage device. Further, the control voltage for the first switch is large enough to hold the first switch "off" for any possible input. The control voltage for the second switch is referenced to the output and hence to the voltage across the hold capacitors. It is made constant and just large enough to hold that switch "off." Therefore, the charge transfer to the "hold" capacitor when the sampling switch opens is minimum and constant over the output voltage range.

As regards transient compensation, the invention is directed to the inclusion; in a sample and hold circuit of means connected with one terminal of the hold capacitor for supplying charge to that capacitor sufficient to compensate for the change in charge developing at the capacitor in response to opening of the sampling switch (as for example the second switch in the described circuit). That means may typically comprise an auxiliary voltage source, an auxiliary switch, and an auxiliary capacitor that is disconnectable by the auxiliary switch from series connection between the auxiliary voltage source and the one terminal of the hold capacitor in predetermined timed relation to opening of the second switch.

These and other objects and advantages of the invention, as well as the details of an illustrative embodiment, will be more fully understood from the following detailed description of the drawings, in which:

DRAWING DESCRIPTION

DESCRIPTION OF PREFERRED EMBODIMENTS

Figure 1:
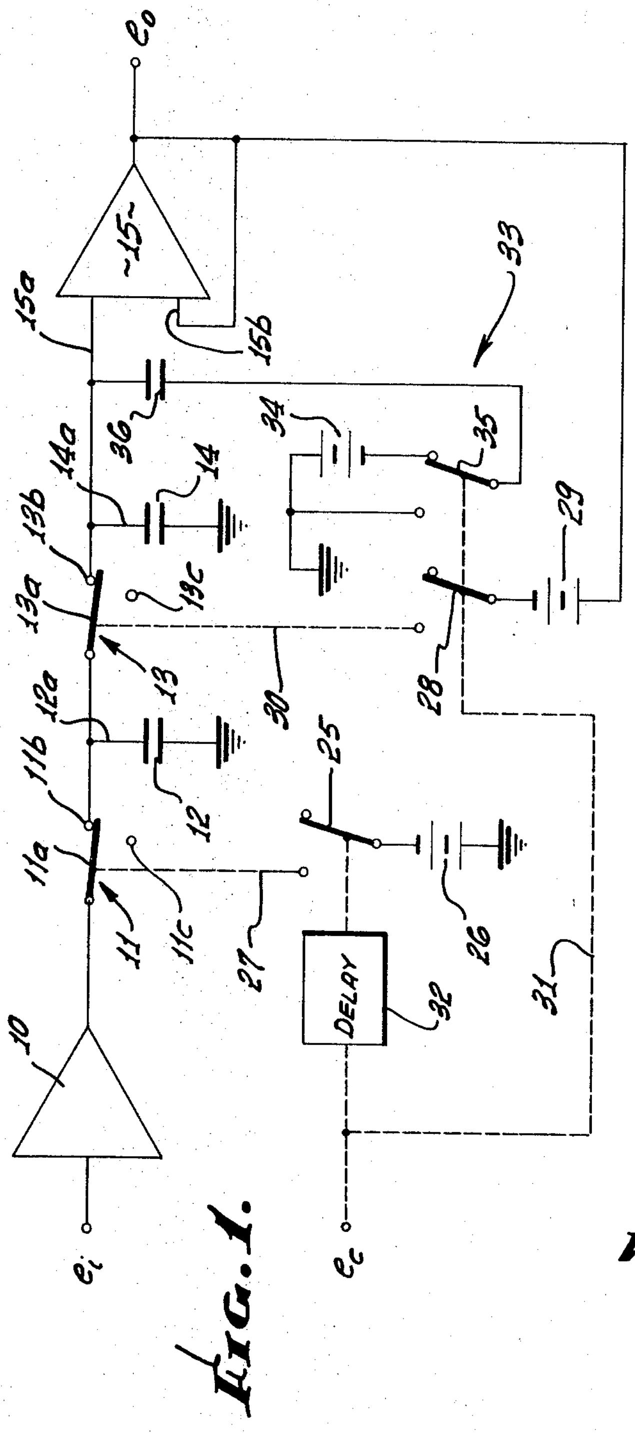
FIG. 1 is a circuit diagram incorporating the invention.

Referring to FIG. 1, input amplifier 10 serves to buffer the switch and capacitor elements 11—14 from the source $e_i$, and output amplifier 15 has a very high input impedance to prevent loading of the hold capacitor 14. The capacitors 12 and 14 are connected in shunt mode, and may be considered as charge storage devices. Switch 11 includes arm **11*a* movable between contacts 11*b* and 11*c*; and likewise, switch 13 includes arm 13*a* movable between contacts 13*b* and 13*c*. Arm 11*a* is connectable via contact 11*b* with one terminal 12*a* of the first storage device 12; and likewise, arm 13*a* is connectable via contact 13*b* with one terminal 14*a* of the second storage device 14, that terminal also being connected with one input terminal 15*a* of the differential amplifier 15. Further, the arms are shown in sample position in FIG. 1. Both devices 12 and 14** may be considered as "hold" capacitors.

Figure 2:
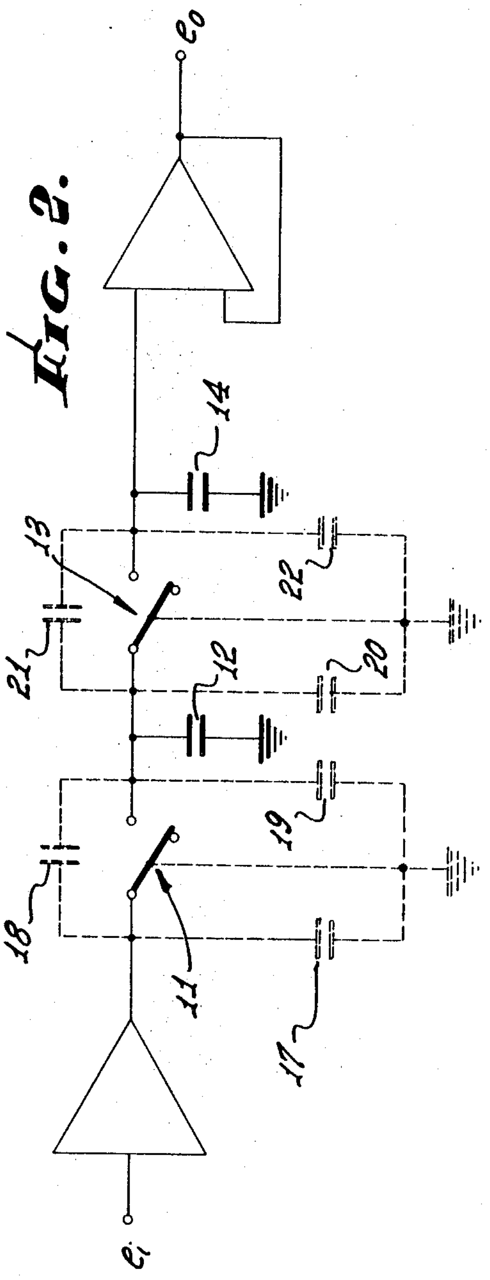
FIG. 2 is a circuit diagram showing a portion of FIG. 1, the switches being in "hold" configuration.

When the switch arms **11*a* and 13*a* are moved to their positions as seen in FIG. 2, the apparatus is "hold" mode. In accordance with a further aspect of the invention, means is provided to open the second switch 13 just prior to opening of switch 11, to achieve the hold mode. For example, the switch 13 may open in less than 100 nanoseconds, and switch 11 may open in less than 250 nanoseconds, after the "HOLD" command. Maintaining the first switch closed while the second switch is moved from closed to open condition serves to more effectively isolate the second switch from the input amplifier during such opening of the second switch, the first capacitor acting as a charge stabilizer. In hold mode, the voltage across the two capacitors 12 and 14** are approximately equal.

Referring to FIG. 2, it will be understood that the use of the two switches 11 and 13 in series and the intermediate hold capacitor 12 results in excellent isolation between input and output during the hold period. In this regard, the parasitic capacitances 17—22 are small compared with the hold capacitors 12 and 14. Parasitic capacitances 17—22 form a two-stage capacitor divider, the first stage consisting of series capacitance 18 with shunt capacitances 17 and 19, and the second stage consisting of series capacitance 21 and shunt capacitances 20 and 22.

Referring again to FIG. 1, the opening of switch 11 is indicated as controlled by switch 25 which upon closing connects voltage source 26 with control 27 for switch 11. Likewise, the opening of switch 13 is indicated as controlled by switch 28, which upon closing connects voltage source 29 with control 30 for switch 13. A common control for switches 25 and 28 is indicated at 31, there being a suitable delay device 32 operating between the control 31 and the switch 25 to achieve the delay referred to above.

Means is also provided to correct for the transient or change in voltage across the hold capacitor 14 due to switching. That means, referred to generally at 33, is connected with one terminal 14*a* of the second capacitor 14 for supplying electrical charge thereto sufficient to compensate for the change in charge developing at 14 in response to opening of switch 13. The compensation may for example be considered as producing a voltage transient equal and opposite to that produced by the switching. Typically, the compensation means may include an auxiliary voltage source 34, an auxiliary switch 35, and an auxiliary capacitor 36 disconnected by (opening of) the auxiliary switch 35 from series connection between the auxiliary voltage source 34 and the terminal 14*a* of hold capacitor 14 in timed relation to opening of the second switch 13. Thus, switch 35 may be opened by control 31 at the same time switch 28 is closed to effect opening of switch 13.

It will also be noted that the voltage source 29 is connected between switch 28 and the second input terminal 15*b* of the differential amplifier 15. Accordingly, if the gain of the amplifier 15 is unity, the amplifier output $e_0$ is equal to the voltage across the hold capacitor. Other amplifier gains are of course possible.

Figure 3:
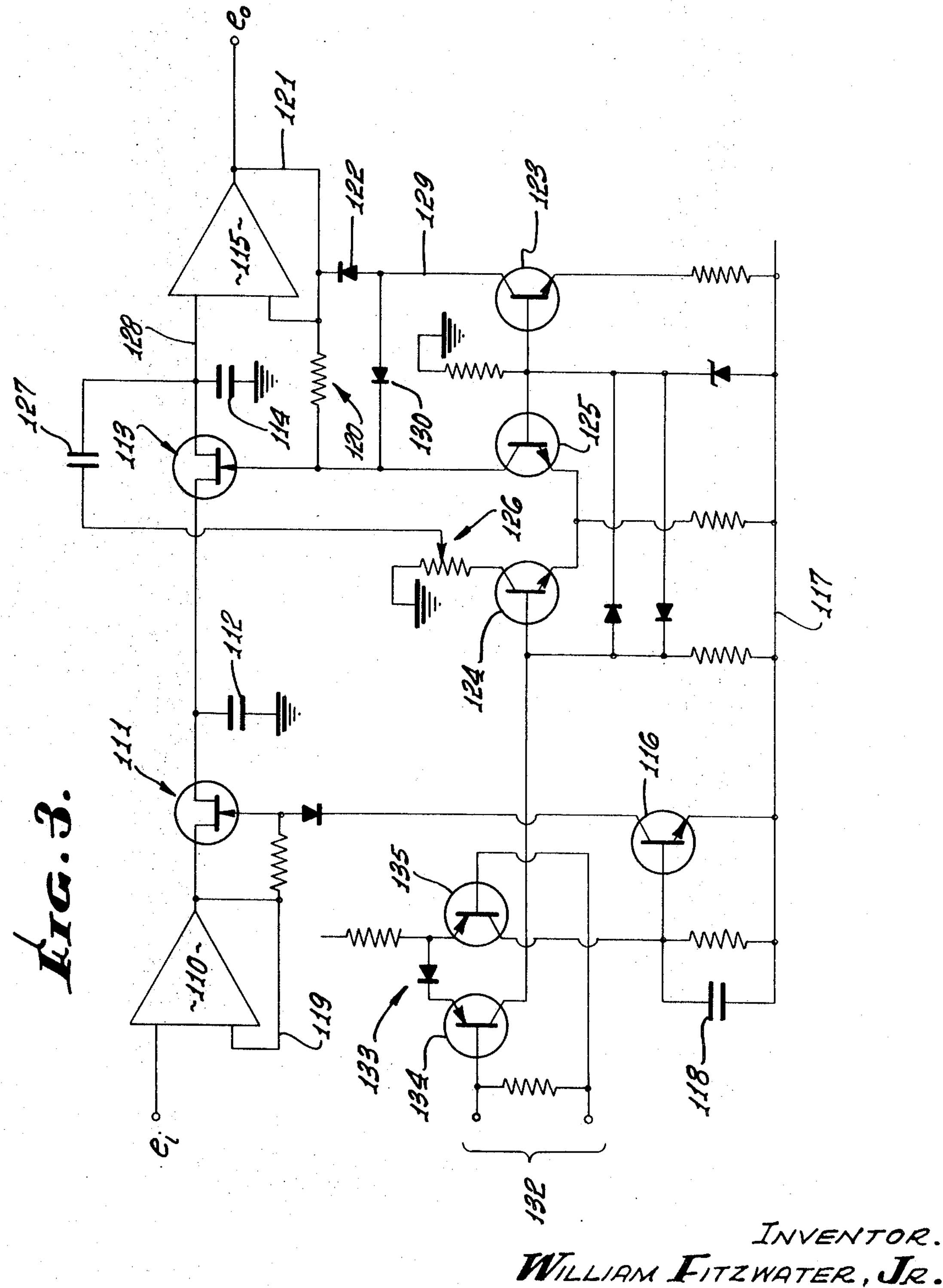
FIG. 3 is a more detailed circuit diagram incorporating the invention.

Referring now to FIG. 3, the input and output amplifiers are designated at 110 and 115; the two switches (corresponding to switches 11 and 13) are indicated at 111 and 113 as N-channel junction field effect transistors; and the two hold capacitors (corresponding to capacitors 12 and 14) indicated at 112 and 114. Switch 111 is switched off (into hold mode) by turning on transistor 116, which connects the gate of 111 to negative voltage source 117. Appropriate time delay is provided by capacitor 118 on the base of 116. Note also that the gate of 111 is referred at 119 to the second input terminal of input differential amplifier 110, the input voltage $e_i$ being applied to the first input terminal of that amplifier.

The second switch 113 has its gate referred at 120 to the second input terminal of output differential amplifier 115. A constant voltage, referenced at 121 to the output of amplifier 115, is developed across the Zener diode 122 driven by constant current source transistor 123. A differential current switch, comprising transistors 124 and 125 provides control for switch 113, and also provides a "jump" or transient compensation voltage at potentiometer 126 and applied via capacitor 127 to the connection 128 between the switch 113 and the differential amplifier 115.

The control voltage for the second switch 113 is clamped to the reference voltage at point 129 by the diode 130.

The bases of the switching transistors 116, 124 and 125 are connected to the control voltage input terminals 132 via the buffer stage 133, and comprising transistors 134 and 135, to provide isolation from that voltage which may be subject to variation.

Finally, the intermediate hold capacitor 112 maintains approximately the voltage at hold capacitor 114.

I claim:

1. In a sample and hold circuit, the combination comprising a. input and output amplifiers, b. first and second charge storage devices, each having opposite terminals, c. a first switch connected in series between the output side of the input amplifier and one terminal of the first storage device, and d. a second switch connected in series between said one terminal of the first storage device and one terminal of the second storage device which is also connected with the input of the output amplifier, e. whereby said devices may be charged by the input amplifier while the switches are closed, and said second switch may be effectively isolated from the input amplifier during opening of said second switch while the first remains closed.

2. The combination of claim 1 wherein said devices comprise capacitors.

3. The combination of claim 1 including means operatively connected with said switches to open the second switch just prior to opening the first switch.

4. The combination of claim 3 wherein said switches comprise gate controlled elements and said means comprises voltage sources and auxiliary switches operable to connect said sources with the gates of said elements.

5. The combination of claim 4 wherein the second amplifier is a differential amplifier having a first input terminal to which said second storage device is connected, and a second input terminal, one of said voltage sources being connectable by one of said auxiliary switches between the gate of said second switch element and the second input terminal of said second amplifier.

6. The combination of claim 4 wherein said switches comprise field effect transistors.

7. The combination of claim 1 including means connected with said one terminal of the second storage device for supplying charge to the second storage device sufficient to compensate for the change in charge developing at the second storage device in response to opening of said second switch.

8. The combination of claim 7 wherein said last-named means comprises an auxiliary voltage source, an auxiliary switch, and an auxiliary capacitor disconnectable by said auxiliary switch from series connection between said auxiliary voltage source and said one terminal of the second storage device in timed relation to opening of said second switch.

9. The combination of claim 1 including control means for said switches wherein the control of the second switch is referenced to the voltage across the second storage device and characterized in that charge transfer to the second storage device is minimized and constant in response to opening of the second switch.

10. In a sample and hold circuit, the combination comprising a. input and output amplifiers, b. a charge storage device, c. a principle switch connected in series between the output side of the input amplifier and one terminal of the storage device which is also connected with the input of the output amplifier, and d. means connected with said one terminal of the storage device for supplying charge to that device sufficient to compensate for the change in charge developing at the storage device in response to opening of said switch.

11. The combination of claim 10 wherein said means includes an auxiliary voltage source, an auxiliary switch, and an auxiliary capacitor disconnected by said auxiliary switch from series connection between said auxiliary voltage source and said one terminal of the storage device in timed relation to opening of the principle switch.